Patented Nov. 9, 1926.

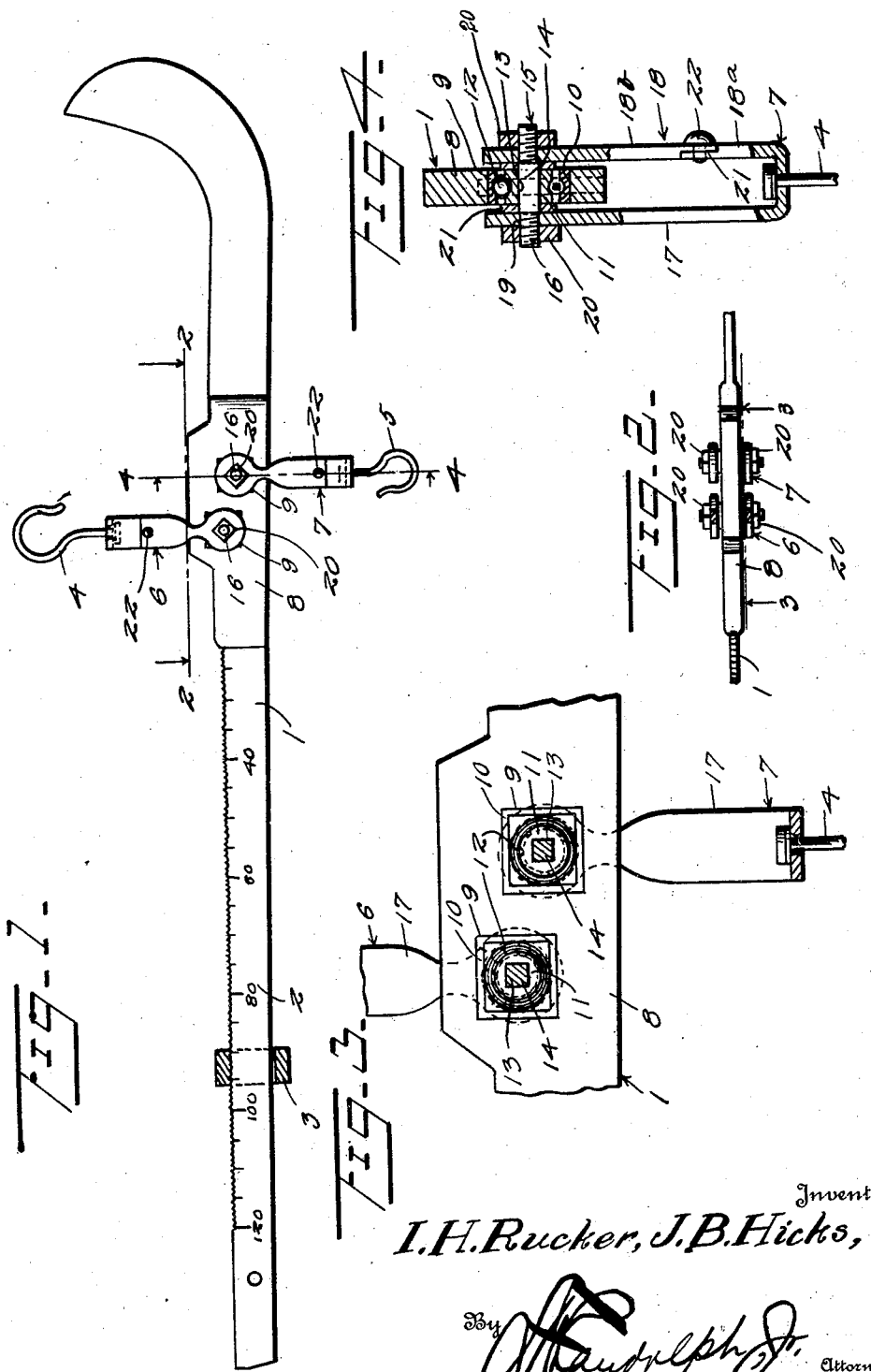

1,606,723

UNITED STATES PATENT OFFICE.

ISAAC H. RUCKER AND JOHN B. HICKS, OF SAFFORD, ARIZONA, ASSIGNORS OF ONE-THIRD TO HARRY L. PAYNE, OF SAFFORD, ARIZONA.

SCALE BEAM AND BEARING THEREFOR.

Application filed January 19, 1926. Serial No. 82,285.

This invention relates to scales generally and more particularly to scales of that type comprising a graduated beam, a weight slidable on the beam, beam suspending and load carrying hooks, and yokes or clevises through the medium of which the hooks are pivotally connected to the beam.

The invention has for one of its objects the provision of a scale of the character stated wherein the yokes or clevises are pivoted to the beam in a manner to reduce the friction between these parts to the minimum, the connection being established through the medium of ball bearings of novel construction and secured to the beam in a novel manner.

A further object of the invention is the provision of a scale of the character stated wherein the yokes or clevises shall each include a detachable portion so as to permit their ready connection with or disconnection from the ball bearings.

With the foregoing and other objects in view, the invention consists of the construction, combination and arrangement of parts hereinafter fully described and claimed, and illustrated in the accompanying drawing, wherein:

Figure 1 is a view in side elevation of a scale embodying our invention,

Figure 2 is a sectional view taken on the plane indicated by the line 2—2 of Figure 1, Figure 3 is a sectional view taken on the plane indicated by the line 3—3 of Figure 2, and Figure 4 is a sectional view taken on the plane indicated by the line 4—4 of Figure 1.

Corresponding and like parts are referred to in the following description, and designated in the several views of the accompanying drawing, by similar reference characters.

In the drawing, 1 designates a scale beam which is graduated as shown at 2 and on which a weight 3 is slidably mounted. A beam suspending hook 4 and a load sustaining hook 5 are pivotally connected to the beam 1 by yokes or clevises 6 and 7, respectively.

In accordance with the present invention, the beam 1 is provided between its ends with a portion 8 of greater thickness than the remainder of the beam. This portion is provided in order to adapt the beam 1 to support ball bearings of considerable size, and said portion is provided with polygonal openings 9 for the reception of the ball bearings. The bearings comprise relatively fixed members 10 arranged within the openings 9, relatively movable members 11 arranged within the members 10, and balls 12 arranged within annular grooves formed in the opposing surfaces of the members 10 and 11. The members 10 are similar in contour to and have a snug fit in the openings 9, and are preferably welded to the beam portion 8. The bearing members 11 are provided with axial openings 13 of polygonal formation for the reception of the polygonal portions 14 of studs 15. The studs 15 project beyond opposite sides of the beam portion 8, and said projecting portions are screw threaded as shown at 16. The studs 15 have a snug fit in the bearing members 11 so as to prevent these parts from having any independent rotary movement. The arms 17 and 18 of the yokes or clevises 6 and 7 are provided with openings 19 for the reception of the ends of the studs 15. Nuts 20 are mounted on the studs 15 outwardly beyond the yoke or clevis arms 17 and 18, and washers 21, adapted to hold the yoke or clevis arms 17 and 18 in spaced relation to the beam portion 8 and bearing members 10, are mounted on the studs 15 between said arms and the bearing members 11. To permit the yokes or clevises 6 and 7 to be readily connected to or disconnected from the studs 15, the yoke or clevis arms 18 are of sectional formation. The sections 18$^a$ and 18$^b$ of these arms are connected together by lap joints 21 and machine screws 22.

From the foregoing description, taken in connection with the accompanying drawing, it will be apparent that the yokes or clevises 6 and 7 are connected to the beam 1 in a manner to permit these parts to move relatively with the least possible friction, that by increasing the thickness of a portion thereof the beam 1 is adapted for use in connection therewith of ball bearings of considerable size, that the ball bearings may be readily applied and secured to the beam 1, and that the yokes or clevises 6 and 7 may be readily applied to the relatively movable bearing members 11. It will be seen further that there is no possibility of movement between the bearing members 10 and beam 1 and between the studs 15 and bearing members 11, and that the arms of the yokes or clevises 6 and 7 cannot contact with the beam 1 and bearing members 10.

While the invention is shown and described in connection with a scale of a particular type, it is to be understood that it is applicable to and that it is our intention to use it in connection with scales of other types. The device shown is merely illustrative, and such changes may be made therein when desired as are within the scope of the invention as claimed.

What is claimed is:—

1. A scale beam having a polygonal opening, a relatively stationary member of similar contour positioned in the opening, a relatively movable bearing member positioned in a relatively stationary bearing member, anti-friction balls positioned between said members, and a suspending element connected to the relatively movable bearing member.

2. A scale beam provided with a polygonal opening, a relatively stationary member of similar contour positioned in the opening, a relatively movable bearing member positioned in a relatively stationary bearing member and provided with a polygonal opening, anti-friction balls positioned between said members, a stud provided with a polygonal portion fitting in the opening of the relatively movable bearing member, and a suspending member secured to the stud.

3. A scale beam having a thickened portion provided with an opening, an anti-friction bearing secured within the opening, a stud carried by the bearing, and a suspending member secured to the stud.

4. A scale beam having an anti-friction bearing embedded therein, a stud carried by the bearing and projecting beyond opposite sides of the beam, and a yoke or clevis having arms provided with openings through which the projecting ends of the stud pass, one arm of the yoke consisting of detachably connected sections.

5. A scale beam having a thickened portion provided with an opening, a relatively stationary bearing member fixed in the opening, a relatively movable bearing member positioned in the relatively stationary bearing member, anti-friction balls positioned between the bearing members, a stud carried by the relatively movable bearing member, a yoke or clevis having arms connected to the stud, and elements interposed between said arms and the relatively movable bearing member to hold the arms out of contact with the beam and relatively stationary bearing member.

In testimony whereof we affix our signatures.

ISAAC H. RUCKER.
JOHN B. HICKS.